United States Patent
Chen et al.

(10) Patent No.: US 12,526,336 B2
(45) Date of Patent: Jan. 13, 2026

(54) SYNCHRONIZED UNICAST RANGING FOR UWB LOCALIZATION

(71) Applicant: GM Global Technology Operations LLC, Detroit, MI (US)

(72) Inventors: Jinzhu Chen, Troy, MI (US); Zijun Han, Rochester Hills, MI (US); Fan Bai, Ann Arbor, MI (US); Aaron Adler, Rochester Hills, MI (US); John Sergakis, Bloomfield Hills, MI (US); Chuan Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 81 days.

(21) Appl. No.: 18/616,733

(22) Filed: Mar. 26, 2024

(65) Prior Publication Data
US 2025/0310404 A1    Oct. 2, 2025

(51) Int. Cl.
| H04L 67/12 | (2022.01) |
| G01S 19/01 | (2010.01) |
| H04W 4/40  | (2018.01) |

(52) U.S. Cl.
CPC .............. *H04L 67/12* (2013.01); *G01S 19/01* (2013.01); *H04W 4/40* (2018.02)

(58) Field of Classification Search
CPC ........... H04L 67/12; G01S 19/01; H04W 4/40
USPC ............................................................. 701/1
See application file for complete search history.

(56) References Cited

U.S. PATENT DOCUMENTS

| 12,152,902 | B2 * | 11/2024 | Russell | G01S 13/878 |
| 2019/0263356 | A1 * | 8/2019 | Golsch | G01S 13/765 |
| 2021/0266746 | A1 * | 8/2021 | Antolinos | H04W 4/029 |
| 2022/0289141 | A1 * | 9/2022 | Shah | B60R 25/01 |
| 2025/0056627 | A1 * | 2/2025 | Reddy | G01S 13/765 |

FOREIGN PATENT DOCUMENTS

| DE | 102020114097 | * | 12/2021 |
| DE | 102020114097 A1 | | 12/2021 |
| DE | 102023110634 | * | 5/2024 |
| DE | 102023110634 A1 | | 5/2024 |

* cited by examiner

*Primary Examiner* — Muhammad Shafi
(74) *Attorney, Agent, or Firm* — Vivacqua Crane, PLLC

(57) ABSTRACT

A method for unicast UWB ranging includes receiving UWB sensor data from a plurality of UWB sensors. The UWB sensors include UWB anchors and a UWB tag. The method further includes assigning a priority to each of the plurality of UWB to create a schedule. Also, the method includes synchronizing a global clock to generate a synchronized global time. Moreover, the method includes determining a maximum time gap and a minimum time gap, wherein the minimum time gap is a minimum amount of time needed between a first sensor reading and a second sensor reading of the plurality of UWB sensors to avoid UWB signal collision, the maximum time gap is a maximum predetermined amount of time between sensor readings of the plurality of UWB sensors; and updating the schedule based on the synchronized global time, the minimum time gap, and the maximum time gap.

11 Claims, 1 Drawing Sheet

SYNCHRONIZED UNICAST RANGING FOR UWB LOCALIZATION

INTRODUCTION

The present disclosure relates to systems and methods for synchronized unicast ranging for UWB localization.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

While conducting unicast, Ultra-wideband (UWB) ranging, UWB signal may collide. It is therefore desirable to develop a method and system for synchronizing the UWB signals, thereby avoiding UWB signal collision.

SUMMARY

A method for unicast UWB ranging includes receiving UWB sensor data from a plurality of UWB sensors. The plurality of UWB sensors includes a plurality of UWB anchors and a UWB tag. The plurality of UWB anchors may be part of a vehicle. The vehicle includes a controller-area network (CAN) bus or other suitable network bus (e.g., Ethernet) connecting the plurality of UWB anchors to one another. The UWB sensor data includes a UWB sensor performance parameter. The UWB sensor data includes a distance between the plurality of UWB anchors and the UWB tag. The method further includes assigning a priority to each of the plurality of UWB anchors based on a UWB sensor performance parameter of each of the plurality of UWB anchors to create a schedule and transmitting the schedule to the plurality of UWB anchors. Further, the method includes synchronizing a global clock to generate a synchronized global time and transmitting the synchronized global time to the plurality of UWB anchors. Also, the method includes determining a maximum time gap and a minimum time gap. The minimum time gap is a minimum amount of time needed between a first sensor reading and a second sensor reading of the plurality of UWB sensors to avoid UWB signal collision. The maximum time gap is a maximum predetermined amount of time between sensor readings of the plurality of UWB sensors. The method also includes updating the schedule based on the synchronized global time, the minimum time gap, and the maximum time gap. Further, the method includes commanding the plurality of UWB anchors to send the UWB sensor data sequentially in a sequence that follows the schedule, thereby avoiding the UWB signal collision while maximizing UWB sensor performance. The method described in this paragraph improves UWB ranging technology by avoiding UWB signal collision while maximizing UWB performance.

In an aspect of the present disclosure, the priority assigned to each of the plurality of UWB anchors is also based on a location of the UWB tag. The UWB sensor performance parameter is a historical tracking distance variance. The schedule is updated such that a timespan between two consecutives sensor readings by the plurality of UWB anchors is equal to or greater than the minimum time gap. The schedule is updated such that a timespan between two consecutive sensor readings by the plurality of UWB anchors is equal to or less than the maximum time gap. The priority assigned to each of the plurality of UWB anchors is also based on an estimated error between an estimated distance from the UWB tag and a first UWB anchor of the plurality of UWB anchor and a measured distance from the first UWB anchor and the UWB tag. The global clock is synchronized using Global Positioning System (GPS) data from a GPS transceiver.

The present disclosure also describes a system for unicast UWB ranging. The system includes a plurality of UWB sensors. The plurality of UWB sensors includes a plurality of UWB anchors and a UWB tag. The system also includes a controller-area network (CAN) bus or other suitable network bus (e.g., Ethernet) connecting the plurality of UWB anchors to one another. The system also includes a gateway coupled to the CAN bus and the plurality of UWB anchors. The gateway includes a processor and a tangible, non-transitory, machine-readable medium connected to the processor, and the processor is programmed to execute the method described above.

The present disclosure also describes a vehicle. The vehicle includes a vehicle body and a plurality of UWB sensors coupled to the vehicle body. The plurality of UWB sensors includes a plurality of UWB anchors and a UWB tag. Each of the plurality of UWB anchors is fixed to the vehicle body such that each of the plurality of UWB anchors remains stationary relative to the vehicle body. The UWB tag is not fixed to the vehicle body such that the UWB tag is movable relative to the vehicle body. The vehicle also includes a computer-area network (CAN) bus connecting the plurality of UWB anchors to one another. The vehicle also includes a gateway coupled to the CAN bus and the plurality of UWB anchors. The gateway includes a processor and a tangible, non-transitory, machine-readable medium connected to the processor. The processor is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
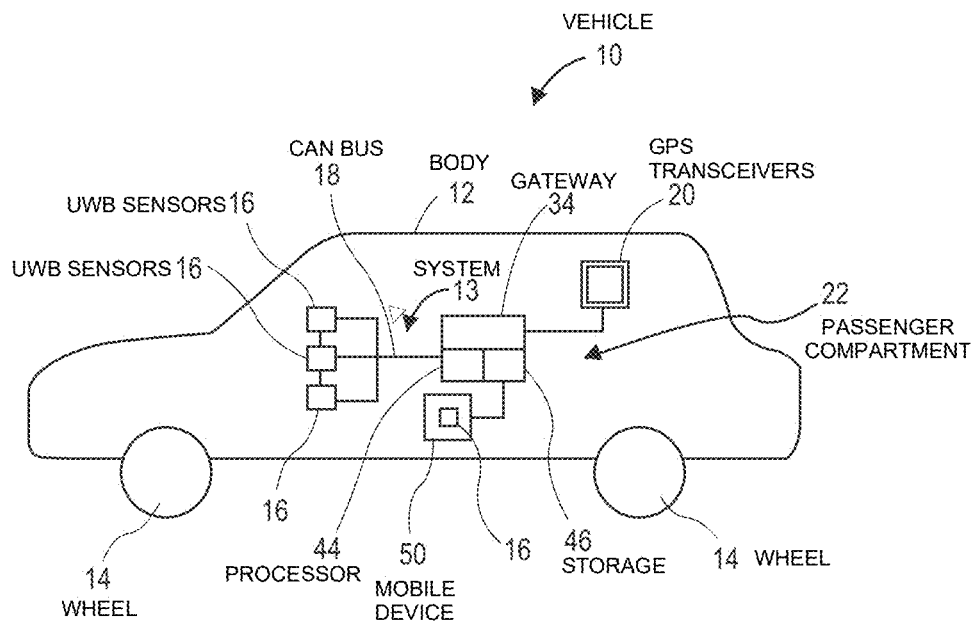
FIG. 1 is a schematic diagram of a vehicle including a system for synchronized unicast ranging for UWB localization.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 generally includes a body 12 and a plurality of wheels 14 coupled to the body 12. The body 12 defines a passenger compartment 22. The vehicle 10 may be an autonomous vehicle. In the depicted embodiment, the vehicle 10 may be a sedan, a truck, a coupe, a sport utility vehicle (SUV), a recreational vehicles (RV).

A system 13 may be part or work together with the vehicle 10. The system 13 may be referred to as a system for synchronized unicast ranging for UWB localization and may include a gateway 34, such as a Message Queuing Telemetry Transport (MQTT) gateway. The gateway 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the gateway 34, a semiconductor-based microprocessor (in the form of a microchip or chip set), a macroprocessor, a combination thereof, or generally a device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the gateway 34 in controlling the vehicle 10. The gateway 34 may be programmed to execute a method 100 (FIG. 2) as described in detail below.

The instructions may include one or more separate programs, each of which comprises an ordered listing of executable instructions for implementing logical functions. The instructions, when executed by the processor 44, receive and process signals from sensors, perform logic, calculations, methods and/or algorithms for automatically controlling the components of the vehicle 10, and generate control signals to automatically control the components of the vehicle 10 based on the logic, calculations, methods, and/or algorithms.

The vehicle 10 further includes a plurality of ultra-wideband (UWB) sensors 16 coupled to the vehicle body 12. The UWB sensors 16 that are coupled to the vehicle 10 serve as UWB anchors and are therefore in a fixed position relative to the vehicle 10. Specifically, the UWB sensors 16 that are coupled to the vehicle 10, such that these UWB sensors 16 remain stationary relative to the vehicle 10. Any suitable fastener, such as screws, bolts, among others, may be used to fix the UWB sensors 16 to the vehicle body 12. Each of the UWB sensors 16 may be configured as chipsets including a UWB transceiver. The UWB sensors 16 are in communication with the gateway 34 and use two-way ranging to locate a mobile device 50. The mobile device 50 includes an UWB sensor 16 that serves as a UWB tag. The UWB sensor 16 of the mobile device 50 may be configured as a chipset including an UWB transceiver. The mobile device 50 may be smart phone, a tablet, a key fob, or any other device that is not physically connected to the vehicle 10 and includes the UWB sensor 16. In the present disclosure, the term "mobile device" is a piece of portable electronic equipment that can communicate with another device at least through UWB signals. The UWB sensor 16 that functions as a UWB tag initializes the ranging message, calculates the distance between the UWB tag and each of the UWB anchors, and publishes these distances and the location information in real-time. The UWB anchors listen to the UWB signals transmitted by the UWB tags and provides feedback.

The vehicle 10 includes a computer-area network (CAN) bus 18 or other suitable network bus (e.g., Ethernet) connecting the plurality of UWB anchors (e.g., UWB sensors 16) to one another. The CAN bus 18 is also connected to the gateway 34. The gateway 34 is in communication with the UWB sensors 16 through the CAN bus 18. The gateway 34 collects the ranging and location messages from the UWB tag and the UWB anchors. Therefore, the gateway 34 is configured to receive UWB sensor data from the UWB sensors 16.

The vehicle 10 may further include one or more Global Positioning System (GPS) transceivers 20. The GPS transceiver 20 is in communication with the gateway 34. The GPS transceiver 20 can therefore transmit GPS data to the gateway 34. The GPS data may include GPS time.

Figure 2:
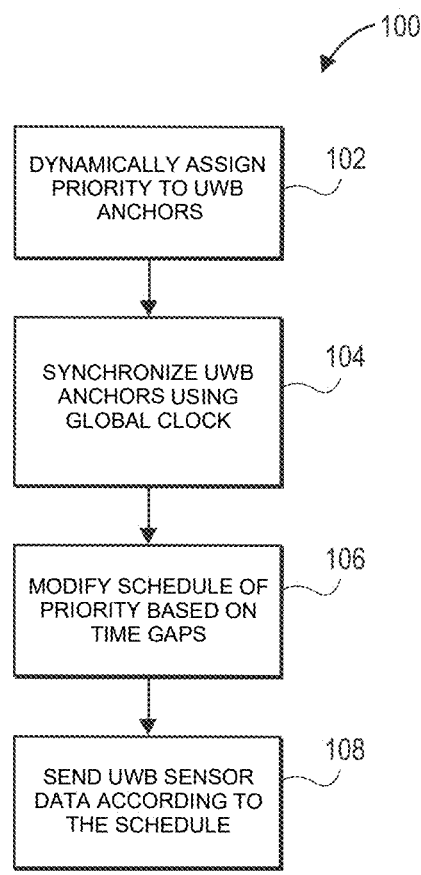
FIG. 2 is a flowchart of a method for synchronized unicast ranging for UWB localization.

FIG. 2 is a flowchart of a method 100 for synchronized unicast ranging for UWB localization. The gateway 34 is programmed to execute the method 100. The method 100 begins at block 102. At block 102, the gateway 34 uses a dynamic priority engine to dynamically assign a priority to each of the plurality of UWB anchors and thereby generate a schedule for the sequential sensor readings of the UWB anchors. Due to line-of-sight issues, some UWB anchors may not be accessible for ranging. Therefore, the dynamic priority engine dynamically adds scheduling slots based on UWB anchor availability. The dynamic priority engine also assigns priority to the UWB anchors to generate a schedule based on one or more UWB sensor performance parameters, target location (i.e., the location of the UWB tag), and neighbor priority to determine the sensor readings frequency of each UWB anchor. The gateway 34 is programmed to use the UWB sensor data to estimate the performance of each individual UWB anchor and assign a priority based on the UWB sensor performance. If the UWB anchor is performing poorly, then such poorly performing UWB anchor will have a low priority for scheduling. As for the target location, the closer the UWB anchor is to the target (i.e., UWB tag), then the higher priority is assigned to that UWB anchor for scheduling. The dynamic priority engine also assigns priority to the UWB anchors based on UWB sensor proximity to each other to ensure enough nearby UWB sensors 16 are scheduled. The gateway 34 then sends the schedule to the UWB anchors.

The dynamic priority also may also assign priority based on UWB sensor data gathered through the wireless sensor network (WSN). The UWB sensors 16 are wirelessly connected to each other and are therefore part of the WSN. The priority assigned to the UWB anchors may be based on data redundancy. For example, UWB sensors 16 that provide redundant or less crucial information may be assigned a lower priority to minimize unnecessary data traffic and conserver network resources. The priority assigned to the UWB anchors may also be assigned based on the location of the UWB sensors 16. For instance, UWB sensors 16 in critical or high-risk areas may be assigned higher priority to ensure real-time monitoring and timely response in case of emergencies. The priority assigned to the UWB anchors may be dynamically adjusted. For example, priorities may be adjusted dynamically based on changing network conditions, such as congestion levels or variations in data traffic. The dynamic priority engine therefore has different goals for high priority UWB sensors 16 and low priority UWB sensors 16. High priority UWB sensors 16 are densely and evenly allocated to ensure accurate localization and to avoid signal collision from clock drifting. Low priority UWB sensors 16 are sparsely allocated to assist in measurements only if the number of high priority UWB sensors 16 drops below a minimum threshold. Further, low priority UWB sensors 16 monitor performance and keep priority score up to date.

As discussed above, the priority assigned to the UWB anchors may be based on UWB sensor data. The UWB sensor data used to assigned priority to UWB sensor may include raw measurement feedbacks. These raw measurement feedbacks may include statistical variations (e.g., historical tracking distance variations) and current measurement frequency. These statistical variations may be based on historical measurements. For example, the statistical variations may be the absolute difference between the slope of a graph of the distance from the UWB anchor to the UWB tag over time and the average slope of the graph of the distance from the UWB anchor to the UWB tag over time. This average slope may be calculated over a predetermine recent time interval (e.g., last ten minutes). Specifically, the historical tracking distance variations may be considered a UWB sensor performance parameter. Therefore, the priority assigned to the UWB anchors may be based on the historical tracking distance variations and/or another UWB sensor performance parameter. As for the historical tracking distance variations, the gateway 34 may detect sharp changes the distance between the UWB anchor and the UWB tag over time using the following equation:

$$\frac{\delta d_i}{\delta t_i} > \alpha \frac{\sum_{k=i-w}^{i} \delta d_i}{w * \delta t_i}$$

where:
$d_i$ is the distance measured at timestamp i;
$\delta d_i$ is the delta distance between two adjacent measured distances at time stamp i;
$\delta t_i$ is the timespan between two consecutive sensor measurements;
w is the window size of a sequential measured distance; and
$\alpha$ is threshold factor representing a sharp measurement change.

The priority assigned to the UWB anchors may also be based on application level feedbacks, such as clustering intersection disagreement and location-based selection (i.e., UWB anchors closer to the UWB tag are assigned higher priority). The clustering intersection disagreement may be determined by calculating the overall UWB sensor offset by the current UWB sensor offset. Through a clustering-based localization algorithm, some UWB sensors 16 may produce inaccurate measurement that is not in agreement with the majority of UWB sensors 16 that form the WSN. Given the predicted location of the UWB tag, the mounting location of a specific UWB anchor and the measured distance from the UWB tag to the same UWB anchor, the estimated offset of the sensed ranging is defined as:

$$\delta_j = |d_j - \sqrt{(x_j - x)^2 + (y_j - y)^2}|$$

wherein $\delta_j > \mu + 2\delta$ are treated as faulty sensors
where:
$(x^0, y^0)$ is the real-time location system (RTLS) predicted location/coordinate of the object being tracked;
$(x_j, y_j)$ is the mounting location of the $j_{th}$ UWB anchor;
$d_j$ is the measured distance between the tracked object (i.e., UWB tag) and the $j_{th}$ UWB anchor;

$\delta_j$ is the estimated offset/error between the estimated distance and the measured distance between tracked object (i.e., UWB tag) and the $j_{th}$ UWB anchor;
$\mu$ is the average measurement error among all offset UWB anchors;
$\delta$ is the standard deviation of measurement error among all tested UWB anchors.

The priority assigned to each UWB anchor may be based on urgency. The urgency may be defined as the average gap between the last recent update and may be calculated using the following equation:

$$U = \frac{\sum_{k=1}^{n} cnt(M_k)}{cnt(M_j)}$$

where:
$M_j$ is the $j_{th}$ task to be scheduled;
U is the urgency factor of task $M_j$;
$cnt(M_j)$ is the number of times that task $M_j$ is being executed;

$$\frac{\sum_{k=1}^{n} cnt(M_k)}{cnt(M_j)}$$

is the execution frequency of task $M_j$ over all tasks;
k is the index number for the UWB anchors; and
n is that last number of the UWB anchors.

The priority assigned to each UWB anchor may be based on the location-based importance of each of the UWB anchors. The location-based importance of each of the UWB anchors may be calculated using the following equations:

$$I^s = \begin{cases} 2, & \text{if } \overline{L_i O_j} \leq \text{rank}^4\{\overline{L_i O_k}\} \text{ where } k \in n \\ 1, & \text{otherwise} \end{cases}$$

$$I^* = \alpha \left( \left| \frac{\delta d_j^i}{\delta t_i} - \frac{\sum_{k=i-w}^{i} \delta d_j^i}{w * \delta t_i} \right| \right)$$

where:
$I^s$ is the location-based importance factor;
$L_i O_j$ is the distance between the tracked target (i.e., UWB tag) and the $j_{th}$ UWB anchor.
rank$^4$ $\{L_i O_k\}$ is the fourth closest UWB anchor to the target (i.e., UWB tag) among all anchors in the WSN;
$I^*$ is the performance-based importance factor;
$d_i$ is the distance measurement between UWB anchor j and the tracked target (i.e., UWB tag) at timestamp i;
$\delta d'$ is the delta distance of the UWB anchor j between two adjacent measured distances at timestamp i;
$t_i$ is the timespan between two consecutive UWB sensor measurements;
w is the window size of a sequential measured distance; and
k is the index number for the timestamp; and
$\alpha$ is the threshold factor representing a sharp measurement change.

The priority assigned to each UWB anchor may be based on processing time to avoid UWB signal collision. The processing may be defined as the minimum gap between two consecutive UWB sensor readings and may be calculated using the following equation:

$$P = w_1 U + w_2 (I^* + I^s) - w_3 T$$

where:

T is the processing time of task $M_j$;

$w_1$, $w_2$, $w_3$: the weight parameter for each priority factors;

U is the urgency factor of task $M_j$;

$I^*$ is the performance-based importance factor;

$I^s$ is the location-based importance factor; and

P is the minimum time gap, wherein the minimum time gap is the minimum amount of time needed between a first sensor reading and a second sensor reading of the UWB sensors 16 to avoid UWB signal collision.

The method 100 further includes block 104. At block 104, the gateway 34 synchronizes the UWB anchors using a global clock. Once the schedule is generated, the UWB sensors are running based on this schedule using their own clock. However, these individual clocks may drift after a while. To address this issue, the UWB anchors may synchronize themselves periodically by monitoring the messages sent through the CAN bus. For instance, the gateway 34 sends a global clock synchronization signal to the UWB anchors to synchronize all the UWB anchors through the CAN bus 18. The global clock synchronization signal includes command data indicating in which timeslot the UWB anchor will start their ranging request (e.g., sensor reading). In one example, the gateway 34 uses GPS time (if available) obtained from a GPS system through the GPS transceiver 20 to synchronize all the UWB anchors and update the schedule based on the GPS time. In another example, the any periodic message (with a known frequency) available in CAN bus 18 may be used to synchronize the UWB anchors. In yet another example, the gateway 34 may send a new scheduling message to synchronize the UWB anchors. For every new UWB ranging session, the global clock is set to zero. If periodic messages are used to synchronize the UWB anchors, all UWB anchors will synchronize their time every periodic message or GPS message using the following equation:

$$T_i = T_{i-1} + N \cdot M$$

where:

i is the synchronization;

$T_i$ is the UWB sensor time at the synchronization i;

$T_{i-1}$ is the UWB sensor time at the synchronization i-1;

N is the number of period or GPS messages; and

M is the message period.

Between synchronizations, the UWB sensors 16 work based on their own clock and keep counting the number of received period messages. Regardless, at the beginning of each UWB ranging session, the gateway 34 generates a synchronized global time for all the UWB anchors.

The method 100 also includes block 106. At block 106, once the schedule is generated, the gateway 34 continues to receive UWB sensor data (e.g., ranging data messages) from the UWB anchors. Upon receipt of the UWB sensor data from the UWB anchor, the gateway 34 determines whether the timespan between two consecutive sensor readings of the UWB anchors are within a maximum time gap and a minimum time gap. The gateway 34 modifies the schedule if the timespan between two consecutive sensor readings of the UWB anchors are not within a maximum time gap and a minimum time gap. Therefore, in the updated schedule, the timespan between two consecutive sensor readings of the UWB anchors are within a maximum time gap and a minimum time gap.

To determine the minimum time gap and the maximum time gap, the gateway 34 considers the timespan between two consecutives sensor readings by the UWB anchors. Further, the gateway 34 uses a divide and conquer approach to determine the minimum time gap and the maximum time gap. The inputs of this approach are UWB anchor identifiers and the report timing of each individual UWB anchor. The UWB anchor identifiers are ordered in a sequential list by sensor reading temporal order. Each UWB anchor has its own report time as observed by the vehicle 10. The output of the divide and conquer approach is an updated sensor report timing for all UWB anchors.

The divide and conquer approach includes a division step. The division step includes finding a cut point along the sensor reading cycle that satisfies two condition. For the first condition, from cycle start to the cut point, it is possible or feasible to achieve a schedule that satisfies the min-max gap constraints. The maximum gap value and the minimum gap value are defined by the applications (e.g., vehicle digital key). For the second condition, from the cut point to the cycle end, it is possible or feasible to achieve a schedule that satisfies the min-max gap constraints. The gateway 34 then counts the UWB sensors between the cycle start and the cut point and the UWB sensors between the cut point and the cycle end. The cut point divides the sensor readings timeline into starting region and ending region.

For the starting region of the sensor reading timeline, the gateway 34 then reassigns the last UWB anchor before the cut point to the cut point in the timeline. Then, the divide and conquer approach is applied again to the starting region of the sensor reading timeline.

For the ending region of the sensor reading timeline, the gateway 34 determines how much time is needed for all the UWB sensor readings to comply with the minimum time gap. To do so, the gateway 34 may use the following equation:

$$t_{needed} = n \times G_{min}$$

where:

$t_{needed}$ is the time needed for all the UWB sensor readings to comply with the minimum time gap;

n is the number of UWB anchors in the ending region; and $G_{min}$ is the minimum time gap between two consecutive UWB sensor readings.

The gateway 34 also determines the budget in the ending region of the sensor reading timeline. To determine this budget, the gateway 34 may use the following equation:

$$B_r = t_e - t_c - t_{needed} = t_e - t_c - n \times G_{min}$$

where:

$B_r$ is the budget in the ending region of the sensor reading timeline;

$t_e$ is the cycling ending time;

$t_c$ is the cut point;

$t_{needed}$ is the time needed for all the UWB sensor readings to comply with the minimum time gap;

n is the number of UWB anchors in the ending region; and $G_{min}$ is the minimum time gap between two consecutive UWB sensor readings.

If the timeline region between the cut point and the first UWB sensor reading after the cut point is a valid point (i.e., the time gap is no less than the minimum time gap and no greater than the maximum time gap) and the timeline region from the first UWB sensor reading after the cut point to the cycle end can be tuned to have a valid schedule, the first UWB sensor reading after the cut point stays in its current timeline location. Otherwise, the gateway 34 requests that the time gap between the cut point and the first UWB sensor reading after the cut point be calculated using the following equation:

$$t_{gap} = G_{min} + B_r/n$$

$t_{gap}$ is the time gap between the cut point and the first UWB sensor reading after the cut point;
$B_r$ is the budget in the ending region of the sensor reading timeline;
n is the number of UWB anchors in the ending region; and
$G_{min}$ is the minimum time gap between two consecutive UWB sensor readings.

The same procedure described above is applied for the starting region of the sensor reading timeline.

The method 100 also includes block 108. At block 108, the gateway 34 updates the schedule based on the synchronized global time, the minimum time gap, and the maximum time gap. Further, at block 108, the gateway 34 commands the UWB anchors to send the UWB sensor data sequentially in a sequence that follows the schedule, thereby avoiding the UWB signal collision while maximizing UWB sensor performance.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for unicast ultra-wideband (UWB) ranging, comprising:
receiving UWB sensor data from a plurality of UWB sensors, wherein the plurality of UWB sensors includes a plurality of UWB anchors and a UWB tag, the plurality of UWB anchors is part of a vehicle, the vehicle includes a network bus connecting the plurality of UWB anchors to one another, the UWB sensor data includes a UWB sensor performance parameter, and the UWB sensor data includes a distance between the plurality of UWB anchors and the UWB tag;
performing the following steps by a processor:
assigning a priority to each of the plurality of UWB anchors based on a UWB sensor performance parameter of each of the plurality of UWB anchors to create a schedule;
transmitting the schedule to the plurality of UWB anchors;
synchronizing a global clock to generate a synchronized global time;
transmitting the synchronized global time to the plurality of UWB anchors;
determining a maximum time gap and a minimum time gap, wherein the minimum time gap is a minimum amount of time needed between a first sensor reading and a second sensor reading of the plurality of UWB sensors to avoid UWB signal collision, the maximum time gap is a maximum predetermined amount of time between sensor readings of the plurality of UWB sensors; and updating the schedule based on the synchronized global time, the minimum time gap, and the maximum time gap; and commanding the plurality of UWB anchors to send the UWB sensor data sequentially in a sequence that follows the schedule, thereby avoiding the UWB signal collision while maximizing UWB sensor performance, wherein the priority assigned to each of the plurality of UWB anchors is also based on a location of the UWB tag, wherein the UWB sensor performance parameter is a historical tracking distance variance, and wherein the schedule is updated such that a timespan between two consecutives sensor readings by the plurality of UWB anchors is equal to or greater than the minimum time gap.

2. The method of claim 1, wherein the schedule is updated such that a timespan between two consecutive sensor readings by the plurality of UWB anchors is equal to or less than the maximum time gap.

3. The method of claim 2, wherein the priority assigned to each of the plurality of UWB anchors is also based on an estimated error between an estimated distance from the UWB tag and a first UWB anchor of the plurality of UWB anchors and a measured distance from the first UWB anchor and the UWB tag.

4. The method of claim 2, wherein the global clock is synchronized using Global Positioning System (GPS) data from a GPS transceiver or broadcasted synchronization message on the network bus.

5. A system for unicast ultra-wideband (UWB) ranging, comprising:
a plurality of UWB sensors, wherein the plurality of UWB sensors includes a plurality of UWB anchors and a UWB tag;
a network bus connecting the plurality of UWB anchors to one another; and
a gateway coupled to the network bus and the plurality of UWB anchors, wherein the gateway includes a processor and a tangible, non-transitory, machine-readable medium connected to the processor, and the processor is programmed to:
receive UWB sensor data from a plurality of UWB sensors, wherein the plurality of UWB sensors includes a plurality of UWB anchors and a UWB tag, the plurality of UWB anchors is part of a vehicle, the vehicle includes a network bus connected the plurality of UWB anchors to one another, the UWB sensor data includes a UWB sensor performance parameter, and the UWB sensor data includes a distance from the plurality of UWB anchors and the UWB tag;
assign a priority to each of the plurality of UWB anchors based on a UWB sensor performance parameter of each of the plurality of UWB anchors to create a schedule;
transmit the schedule to the plurality of UWB anchors;
synchronize a global clock to generate a synchronized global time;
transmit the synchronized global time to the plurality of UWB anchors;
determine a maximum time gap and a minimum time gap, wherein the minimum time gap is a minimum amount of time needed between a first sensor reading and a second sensor reading of the plurality of UWB sensors to avoid UWB signal collision, the maximum time gap is a maximum predetermined amount of time between sensor readings of the plurality of UWB sensors;
update the schedule based on the synchronized global time, the minimum time gap, and the maximum time gap; and
command the plurality of UWB anchors to send the UWB sensor data sequentially in a sequence that follows the schedule, thereby avoiding the UWB signal collision while maximizing UWB sensor performance,
wherein the priority assigned to each of the plurality of UWB anchors is also based on a location of the UWB tag, wherein the UWB sensor performance parameter is a historical tracking distance variance, and wherein the schedule is updated such that a timespan between two consecutives sensor readings by the plurality of UWB anchors is equal to or greater than the minimum time gap.

6. The system of claim 5, wherein the schedule is updated such that a timespan between two consecutive sensor readings by the plurality of UWB anchors is equal to or less than the maximum time gap.

7. The system of claim 6, wherein the priority assigned to each of the plurality of UWB anchors is also based on an estimated error between an estimated distance from the UWB tag and a first UWB anchor of the plurality of UWB anchor and a measured distance from the first UWB anchor and the UWB tag.

8. The system of claim 7, wherein the global clock is synchronized using Global Positioning System (GPS) data from a GPS transceiver or broadcasted synchronization message on the network bus.

9. A vehicle, comprising:
a vehicle body;
a plurality of ultra-wideband (UWB) sensors coupled to the vehicle body, wherein the plurality of UWB sensors includes a plurality of UWB anchors and a UWB tag, each of the plurality of UWB anchors is fixed to the vehicle body such that each of the plurality of UWB anchors remains stationary relative to the vehicle body, the UWB tag is not fixed to the vehicle body such that the UWB tag is movable relative to the vehicle body;
a network bus connecting the plurality of UWB anchors to one another; and
a gateway coupled to the network bus and the plurality of UWB anchors, wherein the gateway includes a processor and a tangible, non-transitory, machine-readable medium connected to the processor, and the processor is programmed to:
receive UWB sensor data from a plurality of UWB sensors, wherein the UWB sensor data includes a UWB sensor performance parameter, and the UWB sensor data includes a distance from the plurality of UWB anchors and the UWB tag;
assign a priority to each of the plurality of UWB anchors based on a UWB sensor performance parameter of each of the plurality of UWB anchors to create a schedule;
transmit the schedule to the plurality of UWB anchors;
synchronize a global clock to generate a synchronized global time;
transmit the synchronized global time to the plurality of UWB anchors;

determine a maximum time gap and a minimum time gap, wherein the minimum time gap is a minimum amount of time needed between two consecutive sensor readings of the plurality of UWB sensors to avoid a UWB signal collision, the maximum time gap is a maximum predetermined amount of time between two consecutive sensor readings of the plurality of UWB sensors; and update the schedule based on the synchronized global time, the minimum time gap, and the maximum time gap; and command the plurality of UWB anchors to send the UWB sensor data sequentially in a sequence that follows the schedule, thereby avoiding the UWB signal collision while maximizing UWB sensor performance, wherein the priority assigned to each of the plurality of UWB anchors is also based on a location of the UWB tag, wherein the UWB sensor performance parameter is a historical tracking distance variance, and wherein the schedule is updated such that a timespan between two consecutives sensor readings by the plurality of UWB anchors is equal to or greater than the minimum time gap.

10. The vehicle of claim 9, wherein the schedule is updated such that a timespan between the two consecutive sensor readings by the plurality of UWB anchors is equal to or less than the maximum time gap.

11. The vehicle of claim 10, wherein the priority assigned to each of the plurality of UWB anchors is also based on an estimated error between an estimated distance from the UWB tag and a first UWB anchor of the plurality of UWB anchor and a measured distance from the first UWB anchor and the UWB tag.

* * * * *